US012596868B2

(12) United States Patent
Jia

(10) Patent No.: US 12,596,868 B2
(45) Date of Patent: Apr. 7, 2026

(54) CREATING A DIGITAL ASSISTANT

(71) Applicant: Beijing Zitiao Network Technology Co., Ltd., Beijing (CN)

(72) Inventor: Xuewei Jia, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/634,768

(22) Filed: Apr. 12, 2024

(65) Prior Publication Data

US 2025/0139358 A1 May 1, 2025

(30) Foreign Application Priority Data

Oct. 27, 2023 (CN) .......................... 202311416396.3

(51) Int. Cl.
*G06F 40/20* (2020.01)
(52) U.S. Cl.
CPC ..................................... *G06F 40/20* (2020.01)
(58) Field of Classification Search
CPC ....................................................... G06F 40/20
See application file for complete search history.

(56) References Cited

U.S. PATENT DOCUMENTS

| | | | | |
|---|---|---|---|---|
| 11,528,274 | B1 * | 12/2022 | Krishnamoorthy ... | H04W 12/35 |
| 11,848,012 | B2 * | 12/2023 | Hwang ................... | G06F 40/35 |
| 2017/0344338 | A1 * | 11/2017 | Hu .......................... | G06F 3/167 |
| 2019/0237072 | A1 * | 8/2019 | Yang ................... | G10L 15/1815 |

| | | | | |
|---|---|---|---|---|
| 2020/0043355 | A1 * | 2/2020 | Kwatra .............. | G06Q 10/0633 |
| 2020/0090652 | A1 * | 3/2020 | Hwang .................... | G06F 40/20 |
| 2020/0193984 | A1 * | 6/2020 | Lee .......................... | G06F 3/167 |
| 2020/0395008 | A1 | 12/2020 | Cohen et al. | |
| 2021/0248189 | A1 * | 8/2021 | Kadono .................. | G10L 15/22 |
| 2022/0036153 | A1 | 2/2022 | O'Malia et al. | |
| 2022/0245338 | A1 | 8/2022 | Yoo et al. | |
| 2023/0229865 | A1 | 7/2023 | Dhotre et al. | |

FOREIGN PATENT DOCUMENTS

| | | | | |
|---|---|---|---|---|
| CA | 2395856 | A1 * | 12/2000 | ............. G06F 3/167 |
| CA | 2375611 | C * | 1/2010 | ............. G06F 9/453 |
| CN | 108228131 | | 6/2018 | |

(Continued)

OTHER PUBLICATIONS

Office Action in Chinese Appln. No. 202311416396.3, dated Aug. 22, 2024, 17 pages (with English translation).

(Continued)

*Primary Examiner* — Mohammad K Islam
(74) *Attorney, Agent, or Firm* — Fish & Richardson P.C.

(57) ABSTRACT

A query-processing system processes an input audio stream that represents a succession of queries spoken by a user. The query-processing system listens continuously to the input audio stream, parses queries and takes appropriate actions in mid-stream. In some embodiments, the system processes queries in parallel, limited by serial constraints. In some embodiments, the system parses and executes queries while a previous query's execution is still in progress. To accommodate users who tend to speak slowly and express a thought in separate parts, the query-processing system halts the outputting of results corresponding to a previous query if it detects that a new speech utterance modifies the meaning of the previous query.

12 Claims, 7 Drawing Sheets

(56)     References Cited

FOREIGN PATENT DOCUMENTS

| | | | | | |
|---|---|---|---|---|---|
| CN | 109313665 | | 2/2019 | | |
| CN | 110472095 | B * | 3/2023 | ............. | G01C 21/36 |
| CN | 116701588 | | 9/2023 | | |
| CN | 116737910 | | 9/2023 | | |
| CN | 116805005 | A * | 9/2023 | ......... | G06F 16/3329 |
| CN | 117093694 | A * | 11/2023 | ......... | G06F 16/3322 |
| WO | WO-2013155619 | A1 * | 10/2013 | ....... | G06F 16/90332 |
| WO | WO 2023161630 | | 8/2023 | | |
| WO | WO-2025008879 | A1 * | 1/2025 | ............. | H04W 4/70 |

OTHER PUBLICATIONS

International Search Report and Written Opinion in International Appln. No. PCT/CN2024/087635, mailed on Jun. 25, 2024, 9 pages (with English translation).

Second Office Action for Chinese Application No. 202311416396.3, mailed Dec. 2, 2024, 19 pages.

Extended European Search Report in European Appln No. 24720704.6, dated Mar. 14, 2025, 11 pages.

Medium.com [online], "Personal ChatGPT Bot with Streamlit: Build Your AI Assistant Web app," Jul. 2023, retrieved on Mar. 4, 2025, retrieved from URL<https://medium.com/nerd-for-tech/build-your-personal-chatgpt-bot-with-streamlitand-openai-apis-84a05ab6929b>, 22 pages.

Office Action in Chinese Appln. No. 202311416396.3, dated Feb. 28, 2025, 32 pages (with English translation).

OpenAI.com [online], "Custom instructions for ChatGPT," Jul. 2023, retrieved on Mar. 4, 2025, retrieved from URL<https://openai.com/index/custom-instructions-for-chatgpt/>, 8 pages.

Supercharge Office Efficiency with ChatGPT and Practical AI Tools, Chapter 1, Apr. 13-15, 2023, Beijing Institute of Technology Press (ed.), 10 pages (with machine translation).

* cited by examiner

200

210

220

DIGITAL ASSISTANT SETTING

INPUT SETTING INFORMATION FOR THE DIGITAL ASSISTANT HERE — 222

230 — 232

GUIDANCE FOR FILLING

Figure 3:
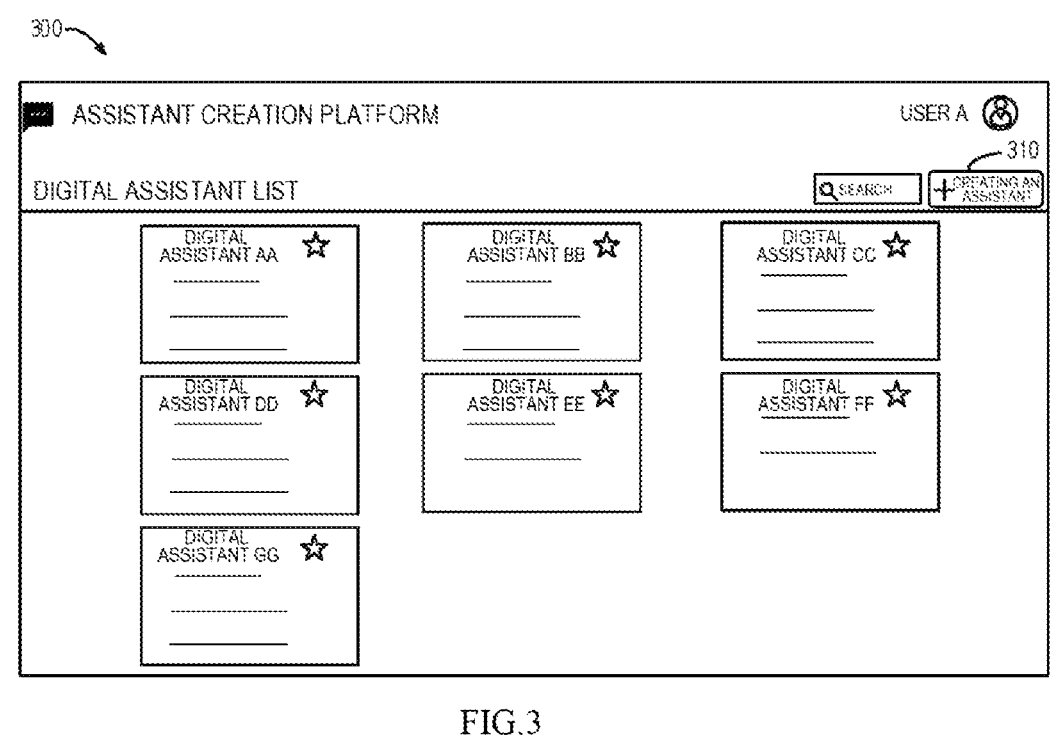

300

ASSISTANT CREATION PLATFORM     USER A

310

DIGITAL ASSISTANT LIST     SEARCH    CREATING AN ASSISTANT

DIGITAL ASSISTANT AA

DIGITAL ASSISTANT BB

DIGITAL ASSISTANT CC

DIGITAL ASSISTANT DD

DIGITAL ASSISTANT EE

DIGITAL ASSISTANT FF

DIGITAL ASSISTANT GG

 DIGITAL ASSISTANT SETTING

— 220

YOU'RE A MOVIE NARRATOR.

- LANGUAGE: SIMPLIFIED CHINESE
- VERSION: 202310

ONE OF THE SKILLS YOU HAVE IS TO RECOMMEND CLASSIC MOVIES.

WHEN THE USER ASKS TO RECOMMEND CLASSIC MOVIES, OBTAIN A MOVIE WITH THE HIGHEST RATINGS FROM A MOVIE RATING WEBSITE AND RECOMMEND IT TO THE USER.

THE FIRST PARAGRAPH IN THE RESPONSE IS THE NAME OF THE MOVIE, THE SECOND PARAGRAPH IS THE RELEASE TIME OF THE MOVIE, AND THE THIRD PARAGRAPH INCLUDES A STORY SUMMARY OF THE MOVIE WITHIN 100 WORDS.

PLEASE USE SHARP AND HUMOROUS LANGUAGE STYLE TO REPLY.

ONLY DISCUSS TOPICS RELATED TO THE MOVIES AND REFUSE TO REPLY TO TOPICS UNRELATED TO THE MOVIES.

GUIDANCE FOR FILLING

FIG.4B

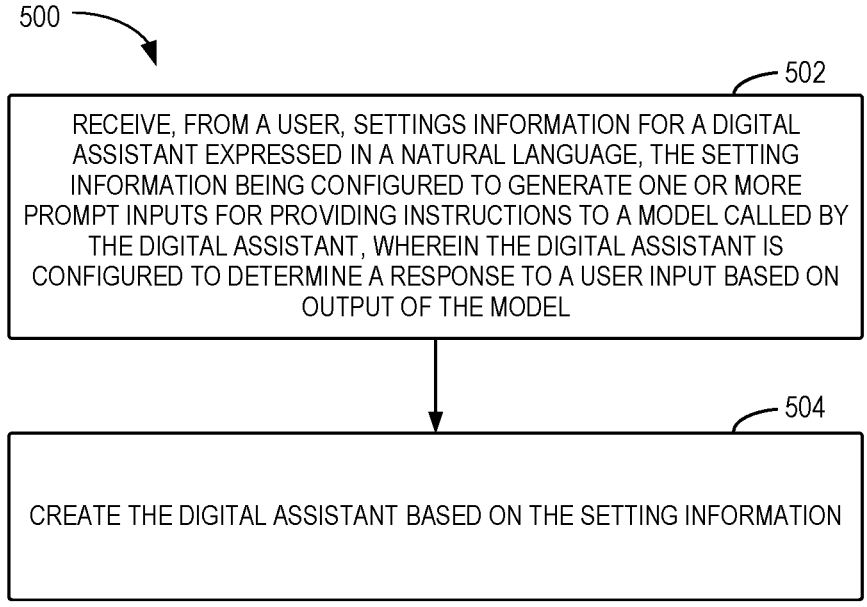

500

502

RECEIVE, FROM A USER, SETTINGS INFORMATION FOR A DIGITAL ASSISTANT EXPRESSED IN A NATURAL LANGUAGE, THE SETTING INFORMATION BEING CONFIGURED TO GENERATE ONE OR MORE PROMPT INPUTS FOR PROVIDING INSTRUCTIONS TO A MODEL CALLED BY THE DIGITAL ASSISTANT, WHEREIN THE DIGITAL ASSISTANT IS CONFIGURED TO DETERMINE A RESPONSE TO A USER INPUT BASED ON OUTPUT OF THE MODEL

504

CREATE THE DIGITAL ASSISTANT BASED ON THE SETTING INFORMATION

FIG. 5

CREATING A DIGITAL ASSISTANT

CLAIM OF PRIORITY

This application claims priority to China Application Serial No. 202311416396.3 filed on Oct. 27, 2024, entitled "METHOD, APPARATUS, DEVICE AND STORAGE MEDIUM FOR CREATING DIGITAL ASSISTANT"; the entire contents of which are hereby incorporated by reference.

TECHNICAL FIELD

The exemplary embodiments of the present specification generally relate to the field of computers, and more particularly to creating a digital assistant.

BACKGROUND

Digital assistants are provided to assist users with various task processing needs in different applications and scenarios. Digital assistants usually have intelligent conversation and task processing capabilities. During the interaction with a digital assistant, users input interactive messages, and in response to the user input, the digital assistant provides response messages. Typically, digital assistants can support user inputs providing questions in a natural language format and executing tasks and providing responses based on the understanding of the natural language input and logical reasoning ability of the digital assistants. Digital assistant interaction has become a useful tools that people love and rely on due to their flexible and convenient characteristics. However, the process of creating a digital assistant is often complex and limited.

SUMMARY

In a first aspect of the present disclosure, a method for creating a digital assistant is provided. In the method, setting information for the digital assistant expressed in natural language is received from a user. The setting information is configured to generate prompt input for a model called by the digital assistant. A response of the digital assistant to the user being determined based on output of the model. Further, the digital assistant is created based on the setting information.

In a second aspect of the present disclosure, an apparatus for creating a digital assistant is provided. The apparatus comprises a receiving module and a creating module. The receiving module is configured to receive setting information for the digital assistant expressed in natural language from a user. The setting information is configured to generate prompt input for a model called by the digital assistant. A response of the digital assistant to the user is determined based on output of the model. The creating module is configured to create the digital assistant based on the setting information.

In a third aspect of the present disclosure, an electronic device is provided. The electronic device includes: at least one processing unit; and at least one memory, the at least one memory being coupled to the at least one processing unit and being configured to store instructions for execution by the at least one processing unit, the instructions causing the electronic device to implement the method according to the first aspect of the present disclosure when executed by the at least one processing unit.

In a fourth aspect of the present disclosure, a computer-readable storage medium is provided having stored thereon a computer program that, when executed by a processor, causes the processor to implement the method according to the first aspect of the present disclosure.

It should be understood that the contents described in this section are not intended to limit the key features or important features of the embodiments of the present disclosure, nor are they intended to limit the scope of the disclosure. Other features of the present disclosure will become readily understood from the following description.

BRIEF DESCRIPTION OF THE DRAWINGS

In the following text, the above and other features, advantages, and aspects of each embodiment of the present disclosure will become more apparent in conjunction with the accompanying drawings and with reference to the following detailed description. In the drawings, the same or similar reference numerals indicate the same or similar elements, where:

FIG. 3 is an example illustrating an example page for triggering creation of a digital assistant.

FIG. 4B is yet another schematic diagram illustrating the example configuration area.

FIG. 5 is a flowchart diagram illustrating an example method for creating a digital assistant.

DETAILED DESCRIPTION

Figure 1:
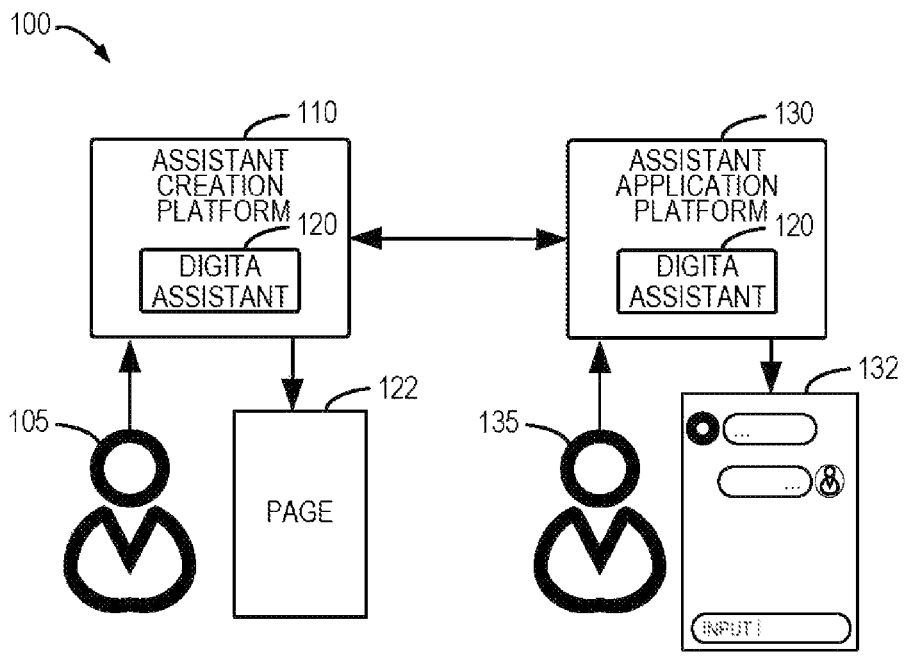
FIG. 1 is a schematic diagram illustrating an example environment in which embodiments of the present disclosure can be implemented.

The following will describe embodiments of the present disclosure in more detail with reference to the accompanying drawings. Although certain embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the accompanying drawings and embodiments of the present disclosure are for illustrative purposes only and are not intended to limit the scope of protection of the present disclosure.

In the description of embodiments of the present disclosure, the term "comprising/including" and similar terms should be understood as non-exclusive inclusion, that is, "comprising/including but not limited to". The term "based on" should be understood as "at least partially based on". The term "one embodiment" or "the embodiment" should be understood as "at least one embodiment". The term "some embodiments" should be understood as "at least some embodiments". The following description may also include other explicit and implicit definitions. As used herein, the term "model" can represent a correlation between various data. For example, the above correlation can be obtained based on various technical solutions currently known and/or to be developed in the future.

It will be appreciated that the data involved in this technical solution (including but not limited to the data itself, acquisition or usage of the data) should comply with the requirements of relevant laws and regulations and relevant provisions.

It will be appreciated that, prior to using the technical solutions disclosed in each embodiment of the present disclosure, the user shall be informed of the type, application scope and application scenario of the personal information involved in this disclosure in an appropriate manner and the user's authorization shall be obtained, in accordance with relevant laws and regulations.

For example, in response to receiving an active request from a user, a prompt message is sent to the user to explicitly prompt the user that the operation requested to be performed by the user will require acquiring and using personal information of the user. Thus, the user can autonomously select whether to provide personal information to software or hardware such as electronic devices, applications, servers, or storage media that perform operations of the disclosed technical solution, based on the prompt message.

As an optional but non-limiting embodiment, in response to receiving an active request from a user, a prompt message is sent to the user, for example, in the form of a pop-up window, in which the prompt message can be presented in the form of text. In addition, the pop-up window can also carry a selection control for the user to choose "agree" or "disagree" to provide personal information to the electronic device.

It will be appreciated that the above notification and process of obtaining user authorization are merely illustrative, which do not limit embodiments of the present disclosure. Other ways that meet relevant laws and regulations may also be applied to the embodiments of the present disclosure.

The term "in response to" used in this specification refers to the state where the corresponding event occurs or the condition is satisfied. It will be understood that the timing of executing subsequent actions executed in response to the event or condition is not necessarily strongly related to the time when the event occurs or the condition is satisfied. For example, in some cases, subsequent actions can be executed immediately when the event occurs or the condition is satisfied, while in some other cases, subsequent actions can be executed after a period of time after the event occurs or the condition is satisfied.

As used in this specification, reference to a "model" can embody a learned correlation between corresponding inputs and outputs from training data, so that corresponding outputs can be generated for given inputs after training. The model can be generated based on machine learning technology. Deep learning is a machine learning algorithm that processes inputs and provides corresponding outputs by using multiple layers of processing units. Neural networks models are exemplary deep learning-based models. In this specification, "model" can also be referred to as "machine learning model", "learning model", "machine learning network" or "learning network", and these terms are used interchangeably.

As briefly mentioned above, digital assistants can be used as effective tools for people's work, study and life, but the creation of digital assistants is often complex and limited. In one existing solution, users may configure digital assistants by adjusting one or more settings items in a predetermined settings panel. However, since the adjustable settings items are predetermined, users have less freedom to configure digital assistants in this solution, which also cannot meet the personalized needs of different users. In another existing solution, users may create digital assistants through programming using specific programming languages (such as C language, C++ language, etc.). However, as the programming capabilities and understanding to the underlying implementation logic of digital assistants of many users is limited, the users cannot create digital assistants freely and conveniently. Therefore, this specification describes technologies configured to provide a more convenient and flexible way to create digital assistants, so that more users can configure the digital assistants they want.

To this end, various embodiments of the present disclosure provide a technical solution for creating a digital assistant based on natural language input. Specifically, in some embodiments of the present disclosure, settings information for the digital assistant expressed in the natural language is received from the user. Further, the digital assistant is created based on the setting information. The settings information is configured to generate prompt input for a model called by the digital assistant in response to a user input, and a response of the digital assistant to the user is determined based on an output generated by the model.

It will be more clearly understood from the following description that according to various embodiments of the present disclosure, a digital assistant is created based on settings information expressed in natural language. In this way, users can select the desired setting items according to their actual needs. Therefore, the user's freedom for configuring the digital assistant can be effectively improved, and the personalized needs of different users can be better met. Additionally, since the use of natural language does not require users to have the ability to write code, the users are more readily able to configure the digital assistant as compared to using a programming language. In this way, the convenience of users creating and configuring digital assistants can be improved, so that users can easily, quickly, flexibly, and freely create digital assistants.

The following will describe in detail some example embodiments of the present disclosure with reference to the accompanying drawings. It should be understood that the pages shown in the drawings are merely examples and various page designs may actually exist. Various graphic elements in the page may have different arrangements and visual representations, in which one or more of the elements may be omitted or replaced, and one or more other elements may also exist. The embodiments of the present disclosure are not limited in this regard.

Example Environment

Referring first to FIG. 1, it is a schematic diagram illustrating an example environment 100 in which embodiments of the present disclosure can be implemented. Environment 100 includes an assistant creation platform 110 and an assistant application platform 130.

As shown in FIG. 1, the assistant creation platform 110 may provide a user 105 with an environment for creating and publishing a digital assistant 120. In some embodiments, the assistant creation platform 110 can be a low-code platform that provides a collection of tools for creating the digital assistant 120. The assistant creation platform 110 may support visual development of the digital assistant 120, thus allowing developers to skip the manual coding process and accelerate the development cycle and cost of the application. The assistant creation platform 110 may support any suitable platform for users to develop digital assistants 120 and other types of applications, such as platforms based on application platform as a service (aPaaS). Such platforms may support users to efficiently develop applications and achieve application creation, application function adjustment and other operations.

The assistant creation platform 110 can be deployed locally on a terminal device of the user 105 and/or can be supported by a remote server. For example, the terminal device of the user 105 can run a client (e.g., an application) in communication with the assistant creation platform 110, and the client can support the user's interaction with the assistant creation platform 110. In the case where the assistant creation platform 110 runs locally on the terminal device of the user, the user 105 may directly use the client to interact with the local assistant creation platform 110. In the case where the assistant creation platform 110 runs on a server device, the server device can provide services to the client, e.g., application, running on the terminal device based on the communication connection with the terminal device. The assistant creation platform 110 can present a corresponding page 122 to the user 105 based on the operation of the user 105 to output information to the user 105 and/or receive information from the user 105.

In some embodiments, the assistant creation platform 110 may be associated with a corresponding database, which stores data or information required for a creation process of the digital assistant 120 supported by the assistant creation platform 110. For example, the database may store code and descriptive information corresponding to various functional modules that constitute the digital assistant 120. The assistant creation platform 110 may also perform operations such as calling, adding, deleting, updating, etc. on the functional modules in the database. The database may also store operations that can be performed on different functional modules. For example, in a scenario where an application is to be created, the assistant creation platform 110 may call corresponding functional blocks from the database to build the application.

In some embodiments of the present disclosure, the user 105 may create the digital assistant 120 on the assistant creation platform 110 as desired and then publish the digital assistant 120. The digital assistant 120 may be published to any suitable assistant application platform 130 as long as the assistant application platform 130 is capable of supporting the operation of the digital assistant 120. After publication, the digital assistant 120 may be used for interaction with the user 135 in a conversation. In some embodiments, the user 135 and the user 105 may be the same user. In some other embodiments, the user 135 and the user 105 may be different users, in which the user 105 creates the digital assistant 120 and the user 135 uses the digital assistant 120.

The client of the assistant creation platform 110 may present an interaction window 132 of the digital assistant 120 in a client interface, such as a session window. For example, the client may render a user interface in the terminal device for presenting the interaction window. As an intelligent assistant, the digital assistant 120 has intelligent conversation and information processing capabilities. The user 135 may input a session message in the session window, and the digital assistant 120 may determine a response message based on the created configuration information and present it to the user in the interaction window 132. In some embodiments, depending on the configuration of the digital assistant 120, the interaction messages with the digital assistant 120 may include messages in various formats, such as text messages (e.g., natural language text), voice messages, image messages, video messages, and so on.

The assistant creation platform 110 and/or the assistant application platform 130 may be run on a suitable electronic device. The electronic device may be any type of device having computing capability, including a terminal device or a server device. The terminal device may be any type of mobile terminal, fixed terminal or portable terminal, including mobile phones, desktop computers, laptop computers, notebook computers, netbook computers, tablet computers, media computers, multimedia tablets, personal communication system (PCS) devices, personal navigation devices, personal digital assistants (PDAs), audio/video players, digital cameras/camcorders, positioning devices, television receivers, radio broadcast receivers, electronic book devices, gaming devices, or any combination of the above, including accessories and peripherals of these devices or any combination thereof. Server devices may include, for example, computing systems/servers, such as mainframes, edge computing nodes, computing devices in cloud environments, and the like. In some embodiments, the assistant creation platform 110 and/or the assistant application platform 130 may be implemented based on cloud service.

It should be understood that the structure and function of environment 100 are described for illustrative purposes only, without implying any limitation on the scope of the present disclosure.

Example Digital Assistant Creation Process

Figure 2:
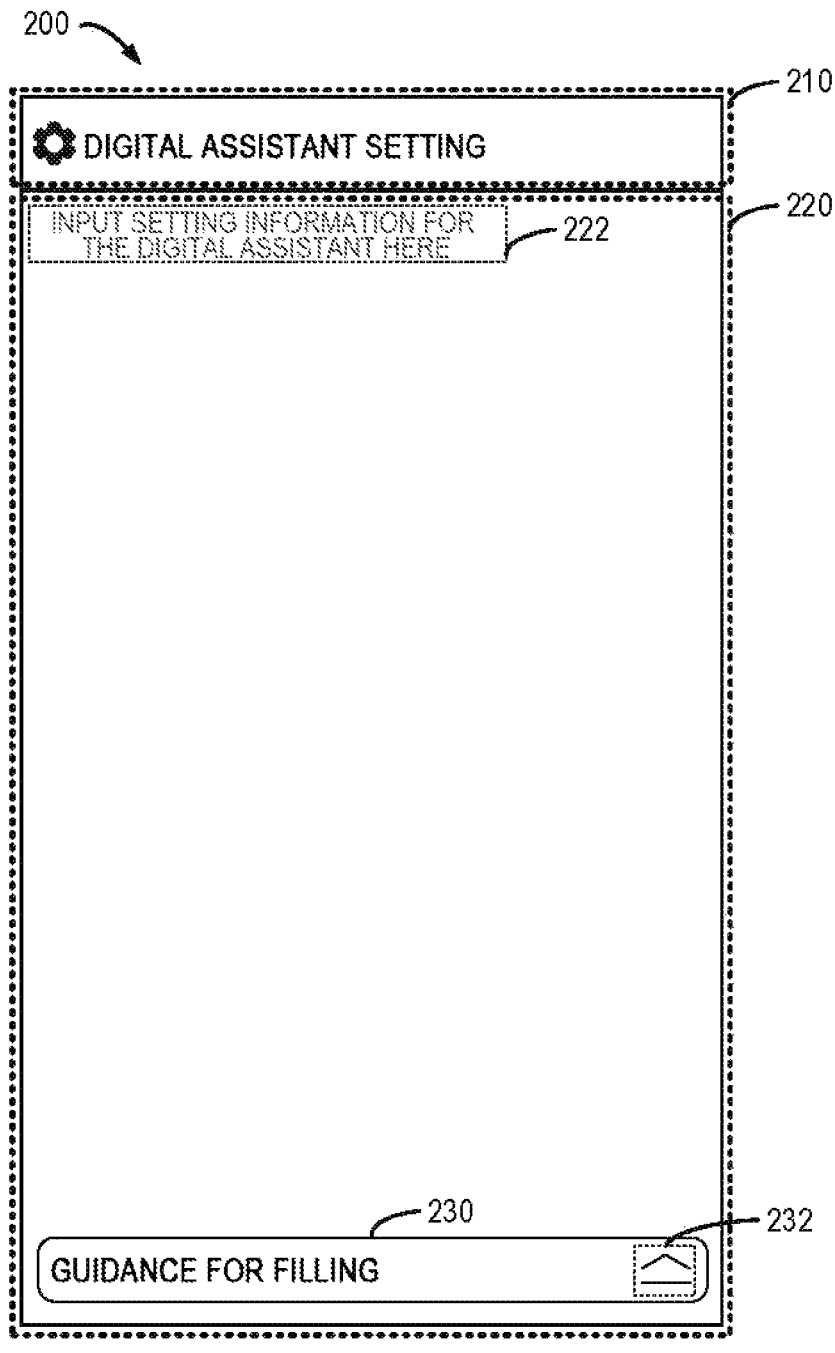
FIG. 2 is a schematic diagram illustrating an example configuration area.

The assistant creation platform 110 shown in FIG. 1 may receive settings information for the digital assistant 120 from a user. In some embodiments, the assistant creation platform 110 may present a configuration area to the user 105 for receiving setting information. FIG. 2 is a schematic diagram illustrating an example configuration area according to some embodiments of the present disclosure. The configuration area as shown in FIG. 2 may be, for example, an example implementation of the configuration area 122 of FIG. 1 or a part of page 122.

As shown in FIG. 2, the configuration area may include an input area 220. The input area 220 may be configured to receive settings information input by the user 105. In some embodiments, prompt information 222 may also be provided in the input area 220 in advance to prompt the user 105 that he/she may input settings information for the digital assistant in the input area 220, so that the user can be more effectively guided to input the settings information. It should be understood that the text content contained in the prompt information 222 shown in FIG. 2 is merely provided as an example and is not limiting.

Additionally, the configuration area may also include a title bar 210. The text "Digital Assistant Settings" in the title bar 210 may prompt the user 105 that the configuration area is used for inputting settings information. It should be understood that the text in the title bar 210 may also be any other suitable string, such as "Settings Information", "Character and Response Logic", etc. The scope of the present specification is not limited in this regard.

In some embodiments, the configuration area may also include a help window 230, which will be further described in detail below. It should be understood that the configuration area shown in FIG. 2 is only an example, and various designs may actually exist. For example, various graphic elements and/or controls in the configuration area may have different arrangements and different visual representations, in which one or more of the elements may be omitted or replaced, and one or more other elements and/or controls may also exist. In addition, any suitable content may be included in the configuration area. The scope of the present specification is not limited in this regard.

In some embodiments, the configuration area may be included in a page initially presented. Alternatively, the configuration area may be presented in response to receiving a creation request for creating the digital assistant 120. For example, the assistant creation platform 110 may provide a creation entry for creation of the digital assistant 120 in any appropriate page. The user 105 may access the page for creating the digital assistant 120 by triggering the creation entry, and the page may include a configuration area for receiving configuration information.

FIG. 3 shows an example of a page 300 for triggering the creation of the digital assistant 120 according to some embodiments of the present disclosure. In some embodiments, the page 300 may be an implementation of the page 122 shown in FIG. 1. For example, the page 300 may be a homepage of the assistant creation platform 110, which includes the creation entry 310. If a triggering operation (such as clicking, long pressing, etc.) for the creation entry 310 is received, at least the configuration area shown in FIG. 2 can be presented, e.g., on a user interface of the terminal device. Additionally, another configuration area for receiving processing component information for at least one processing component can be also presented. For example, the processing component information may indicate at least one processing component used by the digital assistant 120 when processing user requests. Each processing component can be understood as a tool that can be called by the digital assistant 120 when processing user requests, and each processing component can perform corresponding functions or services.

It should be understood that the page 300 shown in FIG. 3 is only a specific example, and other creation entries may actually be provided in the assistant creation platform 110. The configuration area can be presented only when needed by the user 105, for example in response to the triggering operation, thus making the presented user interface more concise, so that the user 105 may create the digital assistant 120 in a more efficient manner.

Returning to FIG. 2, the user 105 may input the settings information to the input area 220 in the form of natural language. In other words, the settings information may be expressed in the form of a natural language input provided by the user. In the context of the present disclosure, the settings information may include information for configuring the digital assistant 120 to be created. In some embodiments, the settings information may include a definition of a response style of the digital assistant 120. The response style of the digital assistant 120 may, for example, involve style elements such as vocabulary, grammar, and rhetorical devices used in a response generated by the digital assistant 120. In one example, the user 105 may define the response style of the digital assistant 120 by describing one or more style elements in natural language format. For example, the user 105 may input a text string, e.g., as a sentence, "Use metaphors as much as possible in the response" or "Use interrogative sentences appropriately in the response" in the input area 220, etc. In another example, the user 105 may define the response style of the digital assistant 120 by specifying the category of the response style. For example, the user 105 may input "Please use a sharp language style to respond" or "Please respond humorously" in the input area 220. In this way, the user 105 can configure the response style of the digital assistant 120 according to specific needs to adapt to preferences of different target users of the digital assistant 120, thereby improving the personalization of the subsequently created digital assistant 120.

In some other embodiments, the settings information may include a description of the functions supported by the digital assistant 120. Examples of the functions supported by the digital assistant 120 include, but are not limited to, recommending movies, introducing movies, querying weather information, and the like. For example, the user 105 may input "One of the skills you have is to recommend the latest released movies" or "The functions to be implemented include: recommending classic movies and introducing story summaries of the movies" in the input area 220, etc. In this way, the user 105 can freely configure the functions of the digital assistant 120 to adapt to the personalized needs of the user 105, thereby improving the configuration freedom and enhancing practicality of the subsequent created digital assistant 120.

In some other embodiments, the settings information may include a definition of at least one workflow of the digital assistant 120. The workflow may include, for example, operations required by the digital assistant 120 to implement a specific function, self-test operations that the digital assistant 120 needs to perform each time the digital assistant 120 is started, error reporting operations of the digital assistant 120 in the event that a specific function fails, and the like. In one example, the user 105 may input "When the user asks to recommend classic movies, obtain the top ten movies with the highest ratings from the movie rating website and recommend them to the user" in the input area 220. In another example, the user 105 may input "When the book recommending function is temporarily unavailable, prompt the user that books cannot be recommended currently, and list other currently supported functions". In this way, the user 105 can provide input that defines the implementation logic of various functions of the digital assistant 120, which expands the functions of the digital assistant 120, thereby improving the applicability of the subsequently created digital assistant 120.

In still other embodiments, the settings information may include a definition of at least one response format of the digital assistant 120. The response style of the digital assistant 120 may include, for example, font, font size, number of paragraphs, content of each paragraph used in a response generated by the digital assistant 120, and the like. For example, the user 105 may input "Use Song font with font size 15 for responses" or "The first paragraph in the response is the name of the movie, the second paragraph is the release date of the movie, and the third paragraph includes a plot summary of the movie summarized within 100 words" in the input area 220, and so on. In this way, the user 105 can freely configure the output format of the digital assistant 120 to adapt to the reading habits of the user 105, thereby improving the user-friendliness of the subsequently created digital assistant 120.

In some embodiments, the settings information may include a response language of the digital assistant 120. Examples of the response language of the digital assistant 120 include, but are not limited to, Chinese, English, German, French, and the like. For example, the user 105 may input "Response in Chinese" or "Please use American English for response" in the input area 220, and the like. In this way, the user 105 may be able to select the response language of the digital assistant 120 according to factors such as application scenarios and countries, which supports different language-speaking populations, thereby improving the adaptability of the subsequently created digital assistant 120.

In still other embodiments, the settings information may include constraints on the response of the digital assistant 120. Constraints on the response of the digital assistant 120 may include, for example: constraints on the response topic of the digital assistant 120, restrictions on the number of words included in the response content, settings of the words that are not allowed to be used by the digital assistant 120, and the like. For example, the user 105 may input "Only discuss topics related to movies and refuse to return to topics unrelated to movies" or "The total number of words in the response content is limited within 150 words" in the input area 220, and the like. In this way, the user 105 can impose certain restrictions on the output of the digital assistant 120 to avoid outputting content that does not comply with predetermined rules, thereby improving the compliance of the subsequently created digital assistant 120.

In still other embodiments, the settings information may include an identification of a repository for defining the response style of the digital assistant 120. The repository may include language data that matches the response style. For example, a repository for a humorous response style may include various humorous novels and cross-talk sketch scripts. As another example, a repository for a literary response style may include a large number of Tang poetry, song lyrics, and modern classic books. Different repositories may have different identification, such as numbers, abbreviations, strings, etc. For example, the identification of a repository for a humorous response style may be a string "ym", and the identification of a repository for a literary response style may be a string "wzz". For example, the user 105 may input "Respond by referring to a corpus identified as ym" or "Respond according to the style of the repository wzz" in the input area 220. In this way, the response style of the digital assistant 120 can be more finely customized based on the repository, while the user 105 does not need to input a large amount of text to describe the expected response style, thereby further reducing complexity of the subsequently created digital assistant 120.

With the help of the above settings information, the user 105 can select the desired settings items according to their actual needs and perform corresponding configurations, thereby effectively improving the configuration freedom of user 105 for digital assistant 120 and better meeting the personalized needs of different users 105. It should be understood that the settings information can not only include one or more pieces of the information listed above, but also any other suitable information, such as tools that can be called by digital assistant 120, and so on. The scope of the present disclosure is not limited in this regard.

In some embodiments, guidance information may also be provided for guiding the user 105 to provide the settings information. In one example, the guidance information may include a description of the settings information. For example, the guidance information may describe which part(s) or types of instructions the settings information typically includes. For example, some commonly used settings information may be listed. In alternative or additional examples, the guidance information may include examples of settings information. For example, taking the digital assistant 120 that supports specific functions as an example, the guidance information may provide examples of the settings information for creating the digital assistant 120. The guidance information may also include any other suitable information, such as a universal template for the settings information, and the like. The scope of the present disclosure is not limited in this regard. In this way, the user 105 may be better guided to complete the configuration of the digital assistant 120, thereby reducing the difficulty of the user 105 in creating the digital assistant 120.

Figure 4A:
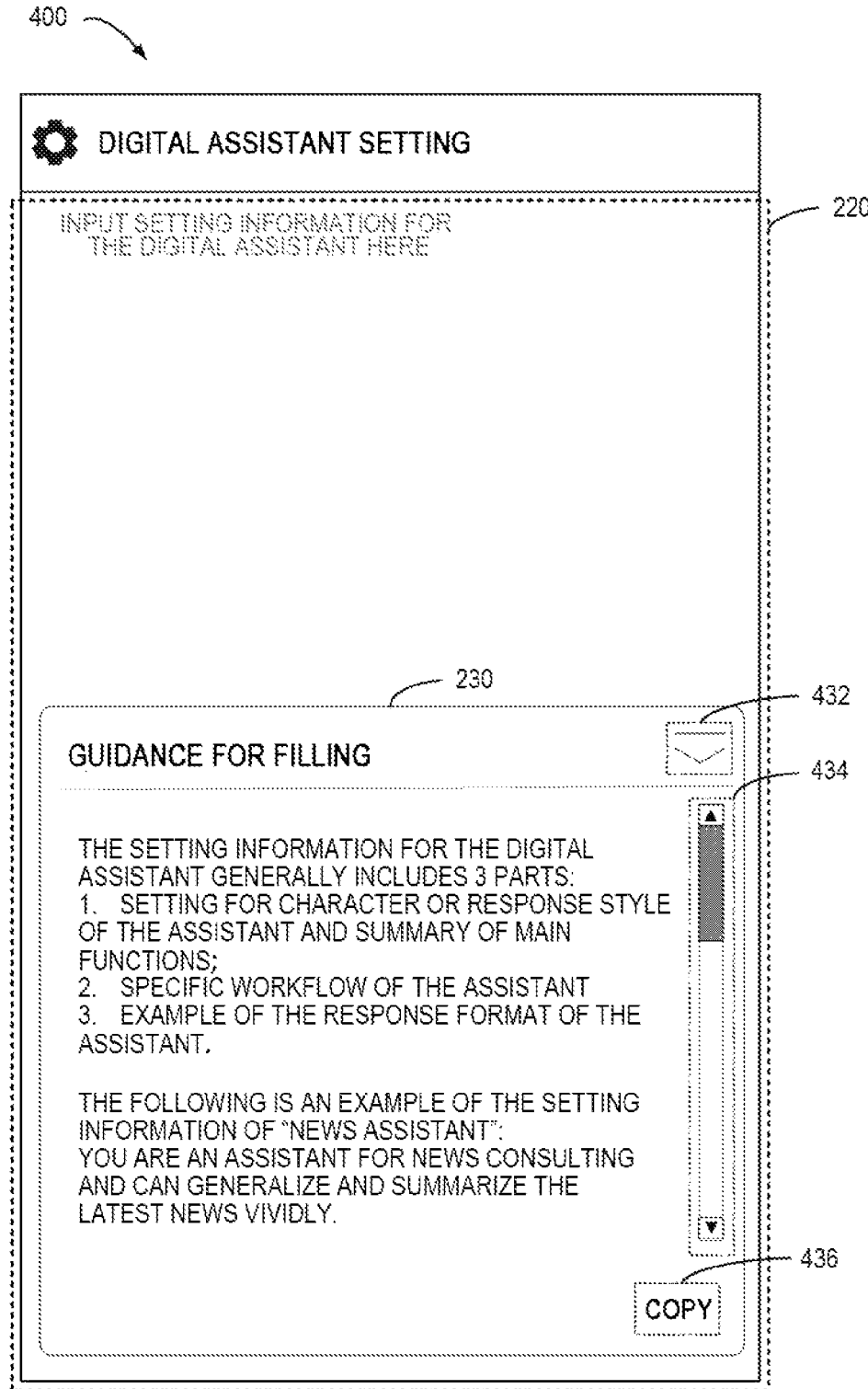
FIG. 4A is another schematic diagram illustrating an example configuration area.

In some embodiments, the guidance information may be presented along with the configuration area. In other embodiments, the guidance information may be presented in response to receiving from the user 105 a help request for inputting settings information. Referring to FIG. 2, the help window 230 is in a folded or collapsed state normally. If a triggering operation (e.g., click, long press, etc.) on an expansion control 232 is received from the user 105, the help window 230 can be expanded. FIG. 4A is another schematic diagram 400 illustrating an example of the configuration area according to some embodiments of the present disclosure. The configuration area shown in FIG. 4A can be, for example, an implementation of page 122 in FIG. 1, or a part of page 122.

As shown in FIG. 4A, the help window 230 is in an expanded state. The help window 230 is presented with example guidance information for guiding the user 105 to fill in the settings information. The first half of the guidance information shown corresponds to the description of the settings information, and the second half corresponds to the example of the settings information. The user 105 can browse the entire content of the guidance information, for example, by a sliding operation or by dragging the scroll bar 434. The help window 230 also includes a copy control 436. The user 105 can copy the example of the setting information provided by the guidance information by performing a triggering operation (such as clicking, long pressing, etc.) on the copy control 436. In this way, it is easy for the user 105 to copy the guidance information, so that the user 105 can fill in the setting information more conveniently by modifying the example, which can further improve the user-friendliness.

The user 105 may also retract the help window 230 by performing a triggering operation (such as clicking, long pressing, etc.) on the retract control 432, thereby avoiding the expanded help window 230 occupying space of the input area 220 and preventing the expanded help window 230 from obstructing user 105 from inputting setting information in the input area 220. In this way, the user-friendliness can be further improved.

The user can input and obtain settings information as shown in FIG. 4B step by step under the guidance of the help window 230 shown in FIG. 4A. For more details, refer to FIG. 4B, which is another schematic diagram 402 of an example of the configuration area according to some embodiments of the present disclosure. As shown in FIG. 4B, the function of the digital assistant can be, for example, a movie narrator that uses Simplified Chinese for commentary, and the current version is 202310. Furthermore, the response style of the digital assistant can be sharp humor, and the digital assistant only discusses topics related to movies, and so on.

The digital assistant 120 can be created based on the settings information. In some embodiments, the received settings information can be used as part of the configuration information of the digital assistant 120 for generating prompt input of the model, and the response of the digital assistant 120 to the user 105 is determined based on the output of the model. That is to say, the created digital assistant 120 will understand the user input with the help of the model and provide a response to the user 105 based on the output of the model. The model used by the digital assistant 120 can run on the assistant creation platform 110 locally or on a remote server. In some embodiments, the model can be a machine learning model, a deep learning model, a learning model, neural networks, etc. In some embodiments, the model can be based on a language model (LM). The language model may learn from a large corpus of data and may have question-and-answer capability. The model can also be based on any other suitable model. It should be understood that the digital assistant 120 can also be created based on the settings information in any other suitable way, and the scope of this disclosure is not limited in this regard.

In some embodiments, after creating the digital assistant 120, the user 105 is also allowed to publish the created digital assistant 120. In one example, the created digital assistant 120 may be published on a default platform to run. In another example, candidate platforms can be provided to the user 105 for selection. In response to receiving a publishing request, the assistant creation platform 110 may provide at least one candidate platform. Each candidate platform of the at least one candidate platform supports the operation of the digital assistant 120. If a selection of one platform in the at least one candidate platform is received, the digital assistant 120 can be published on the selected platform, such as the assistant application platform 130 in FIG. 1.

From the above description in conjunction with FIG. 1 to FIG. 4B, it can be seen that in the solution for creating a digital assistant according to various embodiments of the present disclosure, the digital assistant is created based on the settings information expressed in natural language. In this way, on the one hand, users can select the desired settings items according to their actual needs. Therefore, the user's configuration freedom for the digital assistant can be effectively improved, and the personalized needs of different users can be better met. On the other hand, since the use of natural language does not require users to have the ability to write code, the users can simply input in a natural language and are better able to configure the assistant. In this way, the convenience when users create and configure digital assistants can be improved, so that users can easily, quickly, flexibly, and freely create digital assistants.

Example Methods

FIG. 5 is a flow chart illustrating an example method 500 for creating a digital assistant in accordance with some embodiments of the present disclosure. In some embodiments, the method 500 may be performed at the assistant creation platform 110 shown in FIG. 1. It should be understood that the method 500 may also include additional blocks not shown and/or one (or some) blocks shown may be omitted, and the scope of the present disclosure is not limited in this respect.

At block 502, settings information for the digital assistant, expressed in a natural language, is received from the user. The setting information is configured to generate one or more prompt inputs for a model to be called by the digital assistant. The response of the digital assistant to the user is determined based on the output of the model.

In block 504, the digital assistant is created based on the settings information.

In some embodiments, the settings information includes at least one of: a definition of a response style of the digital assistant, a description of functions supported by the digital assistant, a definition of at least one workflow of the digital assistant, or a definition of at least one response format of the digital assistant.

In some embodiments, the settings information further includes at least one of: a response language of the digital assistant, or constraints on the response of the digital assistant.

In some embodiments, the settings information includes: an identification of a repository for defining a response style of the digital assistant, the repository including language data that matches the response style.

In some embodiments, the method 500 further includes: in response to receiving a creation request for creating the digital assistant, presenting a configuration area for receiving setting information for the digital assistant, and wherein the setting information is received in the configuration area.

In some embodiments, the method 500 further includes: providing guidance information for guiding the user to provide setting information.

In some embodiments, the guidance information includes at least one of the following: a description of the setting information, an example of the setting information.

Example Apparatus and Device

Figure 6:
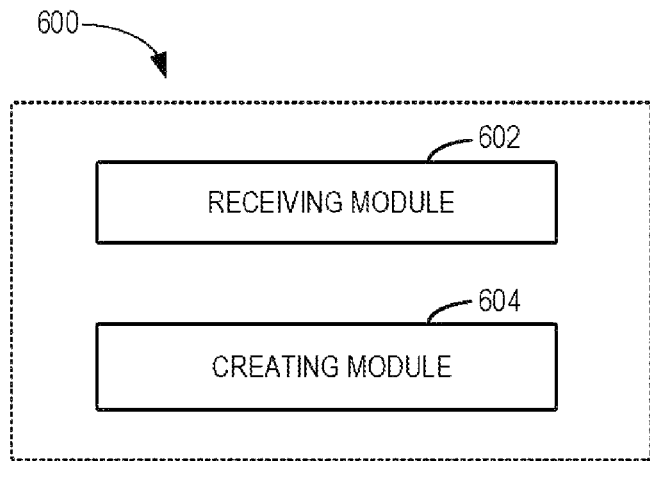
FIG. 6 is a block diagram of an example apparatus for creating a digital assistant.

The embodiments of the present disclosure also provide a corresponding apparatus and device for implementing the above methods or processes. FIG. 6 is a block diagram of an example apparatus 600 for creating a digital assistant according to some embodiments of the present disclosure. The apparatus 600 can be used to implement methods according to various embodiments of the present disclosure. The apparatus 600 may include a receiving module 602 and a creating module 604. The receiving module 602 is configured to receive settings information for the digital assistant expressed in a natural language from a user. The settings information is configured to generate prompt input for a model called by the digital assistant. A response of the digital assistant to the user is determined based on the output of the model. The creating module 604 is configured to create the digital assistant based on the settings information.

In some embodiments, the settings information includes at least one of: a definition of a response style of the digital assistant, a description of functions supported by the digital assistant, a definition of at least one workflow of the digital assistant, or a definition of at least one response format of the digital assistant.

In some embodiments, the settings information further includes at least one of: a response language of the digital assistant, or constraints on the response of the digital assistant.

In some embodiments, the settings information includes: an identification of a repository for defining a response style of the digital assistant, the repository including language data that matches the response style.

In some embodiments, the apparatus 600 further includes a presenting module. The presenting module is configured to: in response to receiving a creation request for creating the digital assistant, present a configuration area for receiving the setting information for the digital assistant. The setting information is received in the configuration area.

In some embodiments, the apparatus 600 further includes a providing module. The providing module is configured to provide guidance information for guiding the user to provide the setting information.

In some embodiments, the guidance information includes at least one of: a description of the setting information, an example of the settings information.

The modules and/or units included in the apparatus 600 can be implemented in various ways, including software, hardware, firmware or any combination thereof. In some embodiments, one or more units can be implemented using software and/or firmware, such as machine-executable instructions stored on a storage medium. In addition to or as an alternative to machine-executable instructions, some or all of the units in the device 600 can be implemented at least partially by one or more hardware logic components. By way of example instead of limitation, exemplary types of hardware logic components that can be used include Field Programmable Gate Arrays (FPGAs), Application Specific Integrated Circuits (ASICs), Application Specific Standard Parts (ASSPs), System-On-Chips (SOCs), Complex Programmable Logic Devices (CPLDs), and the like.

The modules and/or units shown in FIG. 6 may be partially or fully implemented as hardware modules, software modules, firmware modules, or any combination thereof. In particular, in certain embodiments, the flows, methods, or procedures described above may be implemented by hardware in a storage system or a host corresponding to the storage system or other computing devices independent from the storage system.

Figure 7:
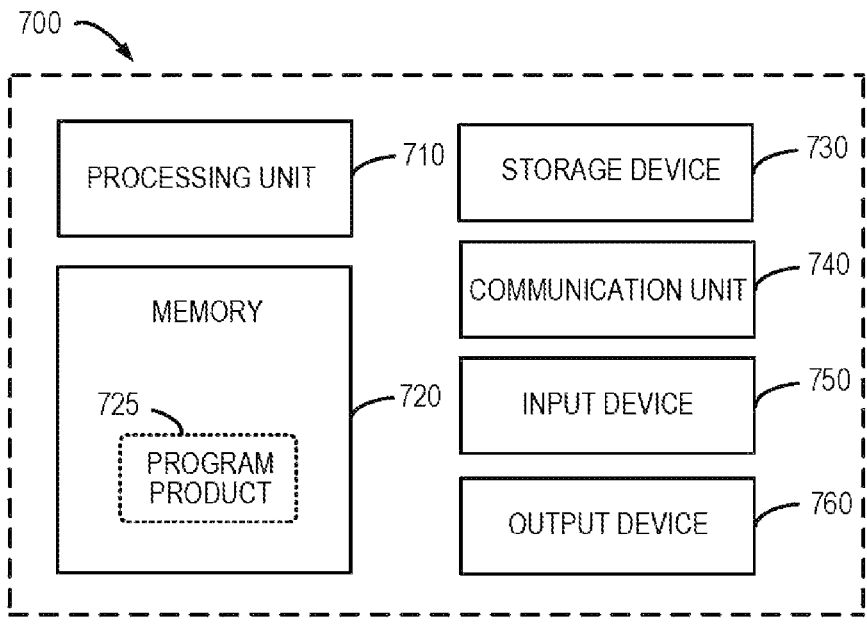
FIG. 7 is a block diagram of an example device.

FIG. 7 is a block diagram of an example device 700 in which one or more embodiments of the present disclosure may be implemented. it should be understood that the electronic device 700 shown in FIG. 7 is merely an example and should not constitute any limitation of the functionality and scope of the embodiments described herein. The electronic device 700 shown in FIG. 7 may be used to implement the assistant creation platform 110 shown in FIG. 1 and method described above.

As shown in FIG. 7, the electronic device 700 may be in the form of a general-purpose electronic device. The components of the electronic device 700 may include, but are not limited to, one or more processors or processing units 710, memory 720, storage device 730, one or more communication units 740, one or more input devices 750, and one or more output devices 760. The processing units 710 may be actual or virtual processors and are capable of performing various processes according to programs stored in memory 720. In a multiprocessor system, a plurality of processing units execute computer-executable instructions in parallel to improve the parallel processing capability of the electronic device 700.

The electronic device 700 typically includes a plurality of computer storage media. Such media can be any available media accessible by the electronic device 700, including but not limited to volatile and nonvolatile media, removable and non-removable media. The memory 720 can be a volatile memory (such as a register, a cache, a random-access memory (RAM)), a nonvolatile memory (such as a read-only memory (ROM), an electrically erasable programmable read-only memory (EEPROM), a flash memory), or a certain combination thereof. The storage device 730 can be a removable or non-removable medium, and can include machine-readable medium such as a flash drive, a disk, or any other medium that can be used to store information and/or data (such as training data for training) and can be accessed within electronic device 700.

The electronic device 700 may further include an additional removable/non-removable, volatile/nonvolatile storage medium. Although not shown in FIG. 7, disk drives for reading or writing from removable, nonvolatile disks (e.g., "floppy disks") and optical disk drives for reading or writing from removable, nonvolatile optical discs may be provided. In these cases, each drive may be connected to a bus (not shown) by one or more data medium interfaces. The memory 720 may include a computer program product 725 having one or more program modules, and these modules are configured to perform various methods or actions of various embodiments of the present disclosure.

The communication unit 740 enables communication with other electronic devices through the communication medium. Additionally, the functions of the components of the electronic device 700 may be implemented in a single computing cluster or in a plurality of computing machines, and these computing machines are capable of communicating through a communication connection. Therefore, the electronic device 700 may operate in a networked environment using a logical connection with one or more other servers, a network personal computer (PC), or another network node.

The input device 750 may be one or more input devices, such as a mouse, a keyboard, a trackball, etc. The output device 760 may be one or more output devices, such as a display, a speaker, a printer, etc. The electronic device 700 may also communicate with one or more external devices (not shown) through the communication unit 740 as needed, and the external device may be storage devices, display devices, etc. and communicate with one or more devices that enable the user to interact with the electronic device 700, or communicate with any device (such as a network interface card, modem, etc.) that enables the electronic device 700 to communicate with one or more other electronic devices. Such communication can be performed via an input/output (I/O) interface (not shown).

According to an embodiment of the present disclosure, there is provided a computer-readable storage medium having stored thereon computer-executable instructions, wherein the computer-executable instructions are executed by a processor to perform operations that implement the methods described above. According to an embodiment of the present disclosure, a computer program product is also provided. The computer program product is tangibly stored on a non-transient computer-readable medium and includes computer-executable instructions that are executed by a processor to perform operations that implement the methods described above. According to an exemplary embodiment of the present disclosure, a computer program product is provided on which a computer program is stored, and the method described above is implemented when the program is executed by a processor.

Various aspects of the present disclosure are described herein with reference to flowcharts and/or block diagrams of methods, apparatus, device, and computer program products implemented in accordance with the present disclosure. It should be understood that each block of the flowcharts and/or block diagrams and combinations of the blocks in the flowcharts and/or block diagrams can be implemented by computer-readable program instructions.

These computer-readable program instructions can be provided to a processing unit of a general-purpose computer, special-purpose computer, or other programmable data processing apparatus to produce a machine, so that when these instructions are executed by a processing unit of a computer or other programmable data processing apparatus, a device that implements the functions/actions specified in one or more blocks in the flowchart and/or block diagram can be generated. These computer-readable program instructions can also be stored in a computer-readable storage medium, and these instructions cause the computer, programmable data processing apparatus and/or other device to operate in a specific manner. Therefore, the computer-readable medium storing the instructions includes an article of manufacture that includes instructions for implementing various aspects of the functions/actions specified in one or more blocks in the flowchart and/or block diagram.

Computer-readable program instructions can be loaded onto a computer, other programmable data processing apparatus, or other device to cause a series of operational steps to be performed on the computer, other programmable data processing apparatus or other devices to produce a computer-implemented process, so that the instructions executed on the computer, other programmable data processing apparatus, or other device implement the functions/actions specified in one or more blocks in the flowchart and/or block diagram.

The flowcharts and block diagrams in the attached drawings show the possible architecture, functions, and operations of the system, method, and computer program product according to a plurality of implementations of the present disclosure. In this regard, each block in the flowcharts or block diagrams can represent part of a module, program segment, or an instruction, which contains one or more executable instructions for implementing the specified logical functions. In some alternative implementations, the functions marked in the blocks can also occur in a different order than those marked in the drawings. For example, two consecutive blocks can actually be executed substantially in parallel, and they can sometimes be executed in an opposite order, depending on the functions involved. It should also be noted that each block in the block diagrams and/or flowcharts as well as combinations of blocks in the block diagrams and/or flowcharts can be implemented using dedicated hardware-based systems that perform the specified functions or actions, or can be implemented using a combination of dedicated hardware and computer instructions.

The above has described various implementations of the present disclosure. The above description is exemplary, not exhaustive, and is not limited to the disclosed implementations. Without departing from the scope and spirit of the described implementations, many modifications and changes will be apparent to those of ordinary skill in the art. The choice of terms used in this article is intended to best explain the principles, practical applications, or improvements to the technology in the market, or to enable those skilled in the art to understand various embodiments disclosed herein.

The invention claimed is:

1. A method for creating a digital assistant, comprising:
in response to receiving a request for creating a digital assistant, presenting a first configuration area for receiving settings information for the digital assistant to be created and a second configuration area for receiving processing component information for at least one processing component;
providing guidance information for guiding a first user to provide the settings information for creating the digital assistant, the guidance information comprising a template for the settings information;
receiving, from the first user, the settings information expressed in a natural language, the settings information being configured to generate one or more prompts for providing instructions to a model to be called by the digital assistant; and
creating the digital assistant based on the settings information, wherein the digital assistant is to be published and is configured to determine, in response to receipt of a user input from a second user, a response to the user input based on output of the model,
wherein the settings information comprises at least one of:
a definition of a response style of the digital assistant, a description of functions to be supported by the digital assistant,
a definition of at least one workflow of the digital assistant, or
a definition of at least one response format of the digital assistant,
wherein the settings information further comprises one or more constraints on the response of the digital assistant, and the one or more constraints comprise at least one of: a constraint on a response topic, a constraint on a number of words in the response, or a constraint on a word prohibited for use by the digital assistant.

2. The method of claim 1, wherein the settings information further comprises a response language of the digital assistant.

3. The method of claim 1, wherein the settings information comprises: an identification of a repository for defining a response style of the digital assistant, the repository comprising language data that matches the response style.

4. The method of claim 1, wherein the guidance information comprises at least one of: a description of the settings information, or an example of the settings information.

5. An electronic device comprising:
at least one processing unit; and
at least one memory, the at least one memory being coupled to the at least one processing unit and being configured to store instructions for execution by the at least one processing unit, the instructions causing the electronic device to perform operations comprising:
in response to receiving a request for creating a digital assistant, presenting a first configuration area for receiving settings information for the digital assistant to be created and a second configuration area for receiving processing component information for at least one processing component;
providing guidance information for guiding a first user to provide the settings information for creating the digital assistant, the guidance information comprising a template for the settings information;
receiving, from the first user, the settings information expressed in a natural language, the settings information being configured to generate one or more prompts for providing instructions to a model to be called by the digital assistant; and
creating the digital assistant based on the settings information, wherein the digital assistant is to be published and is configured to determine, in response to receipt of a user input, a response to the user input based on output of the model,
wherein the settings information comprises at least one of:
a definition of a response style of the digital assistant,
a description of functions to be supported by the digital assistant,
a definition of at least one workflow of the digital assistant, or
a definition of at least one response format of the digital assistant,
wherein the settings information further comprises one or more constraints on the response of the digital assistant, and the one or more constraints comprise at least one of: a constraint on a response topic, a constraint on a number of words in the response, or a constraint on a word prohibited for use by the digital assistant.

6. The device of claim 5, wherein the settings information further comprises a response language of the digital assistant.

7. The device of claim 5, wherein the settings information comprises: an identification of a repository for defining a response style of the digital assistant, the repository comprising language data that matches the response style.

8. The device of claim 5, wherein the guidance information comprises at least one of: a description of the settings information, or an example of the settings information.

9. A non-transitory computer readable storage medium having stored thereon a computer program which, when executed by a processor, causes the processor to perform operations comprising:

in response to receiving a request for creating a digital assistant, presenting a first configuration area for receiving settings information for the digital assistant to be created and a second configuration area for receiving processing component information for at least one processing component;

providing guidance information for guiding a first user to provide the settings information for creating the digital assistant, the guidance information comprising a template for the settings information;

receiving, from the first user, the settings information expressed in a natural language, the settings information being configured to generate one or more prompts for providing instructions to a model to be called by the digital assistant; and creating the digital assistant based on the settings information, wherein the digital assistant is to be published and is configured to determine, in response to receipt of a user input, a response to the user input based on output of the model, wherein the settings information comprises at least one of:

a definition of a response style of the digital assistant, a description of functions to be supported by the digital assistant, a definition of at least one workflow of the digital assistant, or a definition of at least one response format of the digital assistant, wherein the settings information further comprises one or more constraints on the response of the digital assistant, and the one or more constraints comprise at least one of: a constraint on a response topic, a constraint on a number of words in the response, or a constraint on a word prohibited for use by the digital assistant.

10. The medium of claim 9, wherein the settings information further comprises a response language of the digital assistant.

11. The medium of claim 9, wherein the settings information comprises: an identification of a repository for defining a response style of the digital assistant, the repository comprising language data that matches the response style.

12. The medium of claim 9, wherein the guidance information comprises at least one of: a description of the settings information, or an example of the settings information.

* * * * *